(12) United States Patent
Sarin (10) Patent No.: US 10,776,762 B2
(45) Date of Patent: Sep. 15, 2020

(54) MEASURING TAP PRESSURE ON MOBILE DEVICES TO AUTOMATE ACTIONS

(71) Applicant: PAYPAL, INC., San Jose, CA (US)

(72) Inventor: Pankaj Sarin, Chennai (IN)

(73) Assignee: PAYPAL, INC., San Jose, CA (US)

( * ) Notice: Subject to any disclaimer, the term of this patent is extended or adjusted under 35 U.S.C. 154(b) by 1137 days.

(21) Appl. No.: 14/970,990

(22) Filed: Dec. 16, 2015

(65) Prior Publication Data
US 2017/0177135 A1 Jun. 22, 2017

(51) Int. Cl.
| | | |
|---|---|---|
| *G06Q 20/10* | (2012.01) | |
| *G06Q 20/22* | (2012.01) | |
| *G06F 3/0488* | (2013.01) | |
| *G06Q 20/32* | (2012.01) | |
| *G06F 3/0484* | (2013.01) | |
| *G06Q 20/40* | (2012.01) | |

(52) U.S. Cl.
CPC ......... *G06Q 20/10* (2013.01); *G06F 3/04847* (2013.01); *G06F 3/04883* (2013.01); *G06Q 20/227* (2013.01); *G06Q 20/32* (2013.01); *G06Q 20/405* (2013.01)

(58) Field of Classification Search
CPC ...................................................... G06F 3/041
See application file for complete search history.

(56) References Cited

U.S. PATENT DOCUMENTS

| | | | | |
|---|---|---|---|---|
| 8,493,342 | B2* | 7/2013 | Park | G06F 3/016 345/173 |
| 8,587,542 | B2* | 11/2013 | Moore | G06F 3/04883 345/173 |
| 9,417,754 | B2* | 8/2016 | Smith | G06F 3/04886 |
| 9,600,103 | B1* | 3/2017 | Eischeid | G06F 3/04817 |
| 2008/0024459 | A1* | 1/2008 | Poupyrev | G06F 3/016 345/173 |
| 2008/0094367 | A1* | 4/2008 | Van De Ven | G06F 3/0414 345/173 |

(Continued)

OTHER PUBLICATIONS

Polak, P. (2002). The direct and interactive effects of web site delay length, delay variability, and feedback on user attitudes, performance, and intentions (Order No. 3054327). Available from ProQuest Central; ProQuest Dissertations & Theses Global. (305531909). Retrieved from https://search.proquest.com/docview.*

(Continued)

*Primary Examiner* — Muriel S Tinkler
(74) *Attorney, Agent, or Firm* — Haynes and Boone, LLP (57) ABSTRACT

There are provided systems and methods for measuring tap pressure on mobile devices to automate actions. A computing device, such as a mobile smart phone, may include a touch screen interface that may accept touch inputs. A touch input may include a presence and location of the touch input on the touch screen interface. Additionally, the computing device may detect a pressure or force applied to the touch screen interface with the touch input. The computing device may include a payment application, where the touch input may be received during use of the payment application. The pressure of the touch input may further define the input for the payment application. For example, a touch input with a first pressure may cause a first process to be initiated, while a second pressure may cause a second process to be initiated.

20 Claims, 5 Drawing Sheets

(56) References Cited

U.S. PATENT DOCUMENTS

| | | | |
|---|---|---|---|
| 2012/0044172 A1* | 2/2012 | Ohki | G06F 3/0416 |
| | | | 345/173 |
| 2015/0103018 A1* | 4/2015 | Kamin-Lyndgaard | |
| | | | G06F 3/017 |
| | | | 345/173 |
| 2015/0185946 A1* | 7/2015 | Fourie | G06F 3/044 |
| | | | 345/174 |
| 2016/0011715 A1* | 1/2016 | Behdasht | G06F 3/0428 |
| | | | 345/174 |
| 2016/0098184 A1* | 4/2016 | Kim | G06F 3/0487 |
| | | | 715/786 |

OTHER PUBLICATIONS

Hayes, S. T. (2015). Accurate interaction for mobile applications (Order No. 3709312). Available from ProQuest Dissertations & Theses Global. (1694548827). Retrieved from https://search.proquest.com/docview/1694548827?accountid=14753.*

* cited by examiner

MEASURING TAP PRESSURE ON MOBILE DEVICES TO AUTOMATE ACTIONS

TECHNICAL FIELD

The present application generally relates to pressure sensitive touch displays and more specifically to measuring tap pressure on mobile devices to automate actions through the mobile device.

BACKGROUND

Touch screens have become the new standard for input devices used in mobile computing devices, such as mobile phones and tablet computers. These touch screens allow a user to provide input to the mobile device using various graphical user interfaces displayed through the touch screen. The interfaces may include instructions, selections, keys, or other displays that guide a user on proper input to place. Additionally, the touch screens may allow for a range of motions, including a tap, touch, slide, or other type of finger or input stylus movement. However, capacitive and resistive touch screens generally do not detect pressure sensitivity. Thus, the user is generally limited to movements as inputs and touch sensitivity does not factor into inputs provided by the user to the touch screen.

Mobile computing devices may also offer payment services to one or more users, which may allow the users to provide mobile and/or digital payments. For example, a payment application executing on a mobile phone may allow a user to send and receive money, and/or pay for items. However, the payment applications may require multiple inputs to access options within the payment application and/or provide an amount for payment for a transaction. Thus, the user may spend additional time attempting to access correct menu options when the user wishes to provide payments, which may cause loss of use of the payment application.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for measuring tap pressure on mobile devices to automate actions performed by the mobile device. Systems suitable for practicing methods of the present disclosure are also provided.

A computing device may include a touch sensitive input screen, such as a touch screen of a mobile phone that displays information and interfaces to a user. The touch screen may be configured to detect touch inputs, such as a resistive or capacitive touch screen panel. In this regard, the touch screen of the computing device may include particular electronic components and devices to detect a presence and location of a touch or other pressure input (e.g., through a finger or other device, such as a stylus used with touch sensitive devices) to the touch screen. Additionally, the touch screen may be configured to detect an amount of pressure provided with the touch inputs. For example, the touch screen may be configured with a sensitivity setting and associated components to detect pressure applied to the touch screen during the touch input. The pressure may be defined in pascal (Pa), pound-force per square inch (Psi), or other pressure defining unit that determines an amount of force applied to an area (e.g., force per unit of area, include newton per square meter). The touch screen may include one or more touch screen processing applications and additional device components that may detect and read the touch inputs and pressure amount of each of the touch inputs. The application(s) and the component(s) may further provide the information to additional processing system of the computing device for use in operating systems, applications, and application interfaces of the computing device.

In this regard, the computing device may further include a payment application, which may be configured to send and receive payments to another party, such as another user and/or a merchant. The payment application may be associated with a payment provider, such as PayPal® or other online payment provider service, which may provide payments and other services on behalf of user, merchants, and other entities. The payment application may execute on the computing device for a user or a merchant, and may provide various functionalities and processes to the user and/or merchant. For example, a user may utilize the payment application to send and/or receive payments between the user and another user/merchant. The user may wish to provide a payment for a transaction with a user/merchant, transfer money to another family/friend, engage in transaction and statement review, or perform another financial transaction. The merchant may similarly send and/or receive payments between the merchant and another user/merchant, which may include receiving payment for transactions, providing payments to employees and/or for business expenses, transfer money between accounts, or perform further financial transactions. Other entities, such as charitable organizations and businesses may also utilize the payment application, for example, to receive donations from various parties and/or pay business expenses. The online payment provider may be utilized to perform such financial transactions. Additionally, the online payment provider may provide payment accounts and digital wallet services, which may offer financial accounts to send, store, and receive money, process financial instruments, and/or provide transaction histories. The online payment provider may offer further services, such as extension of credit, credit history review, and other financial and personal services.

The payment application may therefore provide one or more processes and features for use of the financial and personal services provided by the online payment provider. The user of the computing device (e.g., a single or group of users, a merchant, or other entity) may utilize the payment application through various input devices of the device. In this regard, the touch screen may be used as an input and output device to receive touch inputs using processes and features of the payment application and display information to the user through an interface displayed on the touch screen. The user may conventionally use the features of the payment application through use of touch inputs, such as a selection of a menu option or interface field with a finger tap (or stylus type device) and other finger motions to interact with the payment application (e.g., double taps, sliding a finger across the touch screen, circular motions with a fingertip, multiple finger taps, etc.). Such touch inputs may allow the user to enter information, make selections, and initiate/engage in processes of the payment application. The touch inputs may be preconfigured for the payment application, or may be set by the user using the payment application or system operating configurations of the device's operating system.

The user may further utilize a pressure of a touch input (e.g., tap, swiping motion, etc.) to provide further input with a touch input. The pressure may provide an additional data point that further specifies the action to take within the payment application. For example, a tap to a touch screen in conventional touch screen systems may merely provide a presence and location of the tap to the touch screen (e.g., selection of an option or displayed information where the tap is located). However, using a pressure of the tap may provide further information, such as if the user means to select the option, change the option, or initiate another process with the tap. The payment application may define the further information for the touch input entered by the amount of pressure. For example, if the user presses the tap with a certain pressure, then the tap may be an acceptance of displayed information (e.g., terms of service, a transaction, etc.). However, if the tap is pressure with another pressure, the tap may correspond to declining the displayed information. Thus, the tap or other touch input may have two or more associated pressure inputs, which may define the type of input provided by the touch input. In this regard, the touch input may have at least a "soft" touch input setting and a "hard" touch input setting, where the soft touch input corresponds to a touch input having a first pressure level that is less than a second pressure level of the hard touch input. The payment provider may specify the amount of pressure input for each touch input, for example, by notifying the user of the amount of pressure to apply (e.g., number of Pa/Psi) or demonstrating the amount to the user through a tutorial interface. Thus, the payment application may specify the action taken by each touch input (e.g., a tip amount, a payment amount, an accept/decline option, a navigation input, etc.) and/or the touch.

The user may also configure the payment application with a pressure amount for each touch input, where the pressure amount for each touch input each executes a different application established by the payment application. The user may access a configuration menu to establish pressure amounts for certain touch inputs to execute an action within an application. Thus, a touch input may include multiple actions depending on the amount of pressure applied with the touch input. For example, the payment application may include a preconfigured action where a finger tap on a tip field of a financial transaction at a merchant restaurant may automatically enter a certain percentage/flat tip amount. The payment application may allow the user to set an amount of the percentage/flat tip amount to enter to the tip field using two or more pressures. For example, a first pressure amount of the touch input may provide 10% tip, while a second pressure amount of the same touch input may provide a 20% tip amount. The user may configure the amount of pressure for each tip amount entered by the touch input using the configuration menu or interface of the payment application. For example, using a setup/configuration process, the user may tap an entry field with an amount of pressure to use for the 10% tip (e.g., 15 Pa). The user may then further tap the entry field with the amount of pressure to use for the 20% tip (e.g., 30 Pa). The configuration setup may utilize a plurality of taps to establish each pressure amount for different actions taken with the touch input in order to establish a range of pressure for each action taken with the touch input. In this regard, for a soft touch input that provides a 10% tip, the user may tap the entry field two or more times to establish a variance in the pressure amount for the soft touch input to provide the 10% tip. Similarly, the user may execute the same process to establish a hard touch input for a 20% tip. In other embodiments, the payment application may include a preconfigured or adjustable variance for the touch input (e.g., 10 Pa difference from the selected pressure amount).

Furthermore, the user may establish actions for a set of touch inputs for the payment application, where each of the touch inputs is associated with an amount or degree of pressure the user applies to the touch input area of the computing device. Thus, the user may set actions for the touch inputs to execute within the payment application. The actions may be selected from a menu or otherwise entered to the payment application (e.g., recording an action taken by a user, entry of code to a configuration process, etc.). Various selectable actions may include a payment amount, a tip amount, a payment contact, or other executable action. For example, an action may correspond to processes such as a payment to a user or a merchant, a setup process to configure the payment application, a review process for a transaction, a refund process to provide a refund to a customer, a transaction dispute process, a transfer process to send a fixed amount of funds, a tip process to provide a tip, and an application process to open the payment application or other application (or display the application on the touch screen). The action may also correspond to an emergency action to execute in the case of an emergency (e.g., a call or emergency message to an authority entity, such as the police). The emergency action may further include a geo-location of the user determined using the device, such as through a GPS locator of the device. The actions may be used in the payment application, or may be used with other applications of the device. For example, the actions may be processes corresponding to a displayed interface of the payment application or while the payment application is execute (e.g., in a background of the operating system of the payment application). In other embodiments, the actions may be executed with another application (e.g., messaging, email, location/mapping, phone call, media playback, social networking, etc., applications) and/or the device's operating system. Thus, the touch input having the pressure setting may be entered to an interface of the payment application, another application, and/or the operating system home interface.

In various embodiments, the touch input may correspond to more than a tap, slide/swipe motion, or other simple finger motion that may be applied to the touch screen. For example, entry of a PIN or biometric (e.g., fingerprint) to unlock a phone may be done with a plurality of pressures such that a different action is taken (e.g., unlock only with a soft touch input of a PIN, instantly open applications and display after unlock, etc.). The touch input may correspond to a plurality of inputs applied to an application with a certain pressure, such as entry of a password/PIN to the payment application, a financial application, and/or another application requiring login credentials/authentication. The pressure of a touch input may also be used with a touch keyboard interface used to provide text entry during use of the device. For example, a hard pressure entry may cause a capital letter to be placed, bold/underline/italic to be used, or otherwise adjust the text input.

Thus, when the user enters a touch input, the device may determine the touch input (e.g., presence, location, and/or motion) and the pressure amount applied during the touch input. The computing device may utilize a contact processing application with the touch screen to determine the aforementioned information. The information may be provided to the payment application or another application executing on the device. Touch inputs with their corresponding pressure amounts may be stored to a database of the device and accessible to the payment application. The device may utilize the stored touch inputs to determine a corresponding action the user would like to execute within the payment application using the touch input and pressure amount. The computing device may then execute the associated action based on the user's touch input and amount of pressure for the touch input. Once the action is determined, the device may interact with another user's device, a merchant device/server, and/or a payment provider server to initiate, engage in, and/or complete a process for the action.

Figure 1:
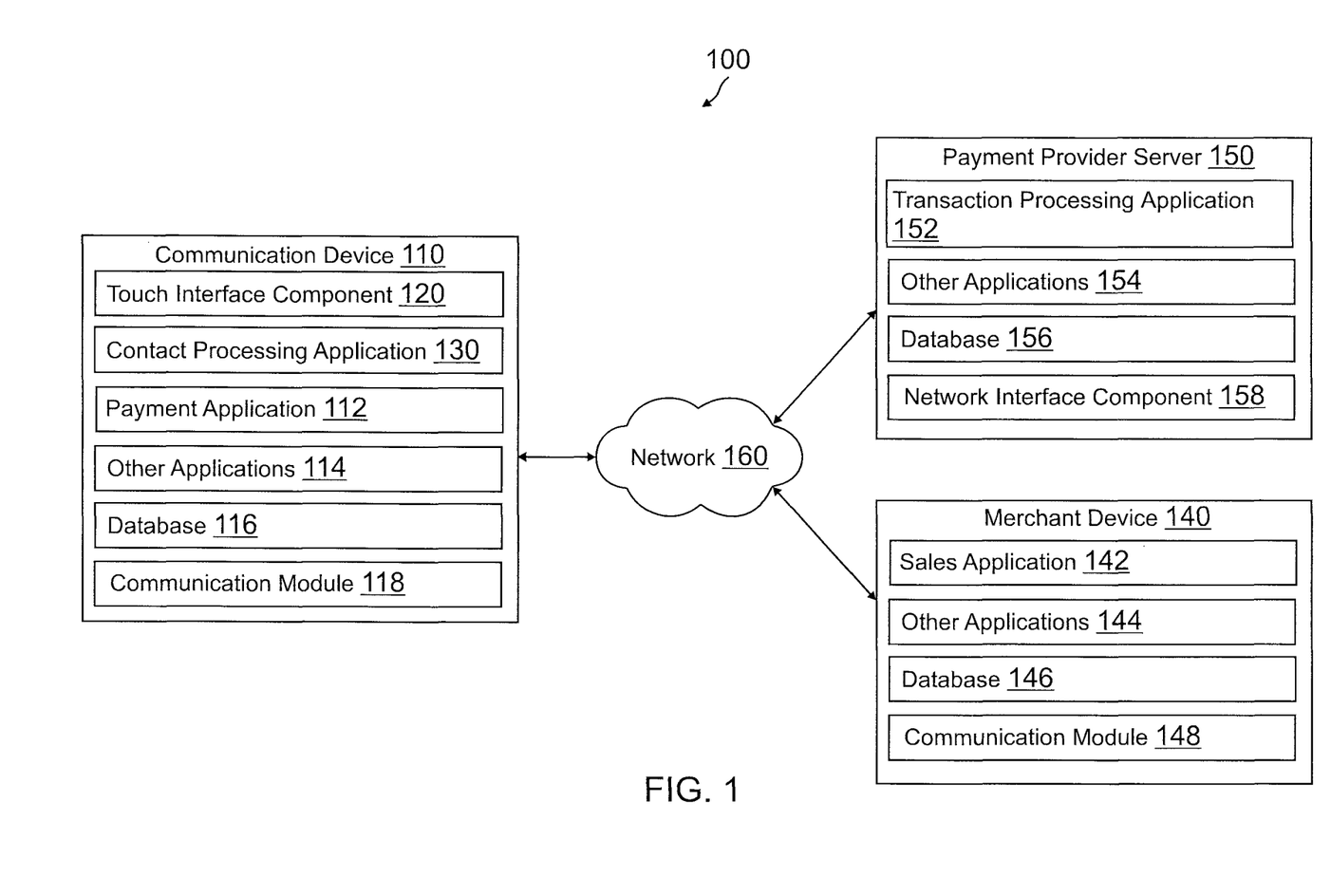
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user, a communication device 110, a merchant device 140, and a payment provider server 150 in communication over a network 160. The user (not shown) may utilize communication device 110 to utilize the various features available for communication device 110, which may include processes and/or applications associated with a touch screen interface component of communication device 110. Communication device 110 may further be utilized to provide payments to one or more entities, such as other users and/or merchants, through an application executing on communication device 110. Various payment processes and features may be initiated, engaged in, and completed using touch inputs to the touch screen of communication device 110. In addition to the touch input, a pressure of the touch input is further used. The touch inputs having a pressure amount may correspond to actions with merchant device 140 and/or payment provider server 150, such as payments to a merchant corresponding to merchant device 140 using payment provider server 150. In certain embodiments, the user may set additional actions to execute by communication device 110 based on a touch input having a pressure amount.

Communication device 110, merchant device 140, and payment provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Communication device 110 may be implemented as a communication device that may utilize appropriate hardware and software configured for wired and/or wireless communication with merchant device 140, and/or payment provider server 150. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Communication device 110 may include or be associated with a touch screen component/device. For example, in certain embodiments, the touch screen component/device may be external to communication device 110 and provide input data to communication device 110 (e.g., through a wired connection or wireless connection over short range wireless communications or a network). Although only one communication device is shown, a plurality of communication devices may function similarly.

Communication device 110 of FIG. 1 contains a touch interface component 120, a contact processing application 130, a payment application 112, other applications 114, a database 116, and a communication module 118. Touch interface component 120, contact processing application 130, payment application 112, and other applications 114 may correspond to executable processes, procedures, and/or applications with associated hardware. In other embodiments, communication device 110 may include additional or different modules having specialized hardware and/or software as required.

Touch interface component 120 may correspond to a hardware component of communication device 110 that may be touch sensitive to detect touch inputs and a pressure or sensitivity of the touch inputs. In this regard, touch interface component may correspond to a touch pad, a touch screen, and/or another type of hardware device that may detect a presence and location of a touch input with a corresponding amount of pressure applied to touch interface component 120 with the touch input. Thus, touch interface component 120 may be pressure sensitive in order to detect an amount of pressure applied during the touch input. In various embodiments, touch interface component 120 may correspond to a touch screen display that may further include an output display component to display interfaces and associated data to a user (e.g., an electronic visual display utilized with operating systems and applications of communication device 110). However, in other embodiments, touch interface component 120 may correspond to a touch pad (e.g., touch pad mouse) that may correspond to a pointing device having a tactile sensor configured to detect the presence of a touch input and corresponding pressure of the touch input. Touch interface component may utilize capacitive sensing screens/panels and/or resistive touch screens/panels in order to provide touch sensing. Thus, touch interface component 120 may include or be associated with one or more sensors utilized to detect a presence, location, and pressure of a touch input. Touch interface component may collect data resulting from a touch input and provide the data to contact processing application 130 for processing.

Thus, contact processing application 130 may correspond to one or more processes to execute software modules and associated devices of communication device 110 to receive raw data associated with a touch input and determine the location on touch interface component 120 where the touch input took place, the amount of pressure applied with the touch input, and other features or actions associated with entry of the touch input having the associated pressure amount. In this regard, contact processing application 130 may correspond to specialized hardware and/or software utilized by a user of communication device 110 receive data from touch interface component 120 when a touch input is applied to touch interface component 120. Contact processing application 130 may process the raw data to determine a touch input for an operating system and/or application of communication device 110 (e.g., payment application 112). Contact processing application 130 may further determine an associated pressure for the touch input. In order to provide detection of a pressure of a touch input, various features may be utilized with the touch interface component, such as detection of a size of the touch input, finger depression, curvature of touch interface component with motion/area detection, or other pressure detection mechanism. However, in other embodiments, the touch screen itself may be pressure sensitive or include pressure sensors to detect pressure applied during a touch input. Thus, contact processing application 130 may provide determination of pressure applied during a touch input. Contact processing application 130 may utilize multiple input data points to determine pressure applied during a touch input. Contact processing application 130 may further provide data for the touch input and pressure amount to applications for processing of the input data (e.g., the touch input presence, location, pressure, and other information) in the application as an input to the application.

Payment application 112 may correspond to one or more processes to execute software modules and associated devices of communication device 110 to enter one or more payment instruments or other funding sources for storage in a digital wallet associated with a payment account (e.g., stored and/or serviced by payment provider server 150), access the digital wallet and/or payment account for use, and provide payments to another entity through touch inputs having a pressure amount detected using touch interface component 120 with contact processing application 130. In this regard, payment application 112 may correspond to specialized hardware and/or software utilized by a user of communication device 110 that provides an interface to permit the user to enter input and other data for payment instruments, for example, through an input device (e.g., touch screen with a graphical user interface displayed by payment application 112, keypad/keyboard, mouse, etc.) and/or through a data capture device (e.g., scanner, camera, other optical device, etc.) In various embodiments, information for the payment account may also be stored to communication device 110 for use in an offline environment. The payment account accessible through payment application 112 may be used to initiate, receive, and/or process/complete transactions using services provided by payment provider server 150. Once entered, the payment instruments may be communicated to payment provider server 150 over network 160 by payment application 112 for establishment and/or maintenance/update of the payment account and/or entry into the digital wallet. The user of communication device 110 may also enter benefits to payment application 112. The benefits may correspond to one or more of rewards programs, rewards programs membership level, rewards program points, available items in at least one rewards program, cash-back amounts for the at least one rewards program, airline miles, promotional credit, promotional credit rates, promotional discount rate, merchant discounts, merchant discount rates, and merchant coupons.

Payment application 112 may be implemented as a user interface enabling the user to select and provide payment. In various embodiments, payment application 112 may include a general browser application configured to retrieve, present, and communicate information over the Internet (e.g., utilize resources on the World Wide Web) or a private network. For example, payment application 112 may provide a web browser, which may send and receive information over network 160, including retrieving website information (e.g., a website for payment provider server 150), presenting the website information to the user, and/or communicating information to the website, including payment information for payment through payment provider server 150. However, in other embodiments, payment application 112 may include a dedicated application of payment provider server 150 or other entity (e.g., a merchant), which may be configured to assist in processing purchase requests.

Payment application 112 may be utilized to select payment instrument(s) for use during in providing payment for a transaction, transfer, or other financial process. As discussed herein, payment application 112 may utilize user financial information, such as a credit card, bank account, or other financial account, as a payment instrument when providing payment information. Additionally, payment application 112 may utilize a user account with payment provider, such as payment provider server 150, as the payment instrument. Selection of a payment instrument may occur prior to, at, or after establishment of the financial process, for example, through touch inputs having an associated pressure amount. Payment provider server 150 may then use the payment instrument during processing of payment, as discussed herein with respect to payment provider server 150. Payment application 112 may be utilized to view the results of payment, for example, using transaction histories, dispute resolution processes, and other post-transaction process.

As discussed herein, payment application 112 may receive touch inputs to touch interface component 120 of communication device 110. Information may be displayed to a user of communication device 110 by payment application 112 using touch interface component 120. The user may interact with the information presented by payment application 112 through inputs using touch interface component 120. The inputs may correspond to touch inputs using a finger or stylus type device, including a tap, double taps, sliding a finger across the touch screen, circular motions with a fingertip, multiple finger taps, etc., which can cause actions based on the specific input or based additionally on a pressure or pressures applied in performing the specific inputs. For example, a circular motion with "soft" pressure may initiate one action, with "hard" pressure may indicate a second action, with a "soft" to "hard" increase in pressure may initiate a third action, and with a "hard" to "soft" decrease in pressure may initiate a fourth action. Such touch inputs may allow the user to enter information, make selections, and initiate/engage in processes of payment application 112. Payment application 112 may receive preconfigured touch inputs, such as selection through a tap, highlighting through a sliding a finger, or other motion. In further embodiments, the user may establish and setup customized motions having an associated action to execute when using the motion. Both preconfigured and customized motions may be associated with a corresponding pressure to define the process to execute in payment application 112 when receiving the touch input.

Thus, payment application 112 may utilize the touch input and the pressure of the touch input as input data when determining an action or process to execute in payment application 112. Using a pressure of the touch input may provide further information, such as if the user means to select the option, change the option, or initiate another process with the tap. Payment application 112 may associate various pressure amounts of a touch input with different actions, including a tap with low pressure/force to accept a transaction and a tap with high pressure/force to decline a transaction. Accordingly, touch inputs may have two or more pressure sensitivities that determine a process or action to execute based on the touch input and the pressure applied to touch interface component 120 using the touch input. In this regard, the touch input may have at least a "soft" touch input setting and a "hard" touch input setting, where the soft touch input corresponds to a touch input having a first pressure level that is less than a second pressure level of the hard touch input. Payment application 112 may determine the action to execute based on each touch input and the corresponding pressure. Thus, payment application 112 may determine that a first action is executed when a touch input is provided to touch interface component 120 with a first pressure, where a second action is executed when the touch input is provided with a second pressure. For example, payment application 112 may include a preconfigured action where a finger tap on a tip field of a financial transaction at a merchant restaurant may automatically enter a certain percentage/flat tip amount based on the amount of pressure applied, as established by payment application 112.

The user may also set the action to execute with each touch input having an associated pressure. For example, payment application 112 may provide a configuration and setup process for processes of payment application 112 to execute based on a touch input having a pressure amount. In this regard, a finger/stylus motion (e.g., a tap, swipe, etc.) may have multiple pressures, where each pressure of the motion initiates a different process in payment application 112. In the tip example provided above, payment application 112 may allow the user to set an amount of the percentage/flat tip amount to enter to the tip field using two or more pressures. For example, a first pressure amount of the touch input may provide 10% tip, while a second pressure amount of the same touch input may provide a 20% tip amount.

In order to establish the first pressure amount and the second pressure amount, payment application 112 may provide a process to enter touch inputs having a desired pressure by the user. Using the process provided by payment application 112, the user may provide a touch input to an entry field with an amount (e.g., 15 Pa). Payment application 112 may then associated this pressure amount with the action (e.g., a 10%) tip. The user may then further tap the entry field with the amount of pressure (e.g., 30 Pa) for the next action (e.g., a 20% tip). Payment application 112 may require a plurality of inputs when setting each pressure amount to establish a variance in pressure applied with a touch input to select an action for execution (e.g., 0-15 Pa for the 10% tip where each touch input was measured from 0-15 Pa). In other embodiments, payment application 112 may include a preconfigured or adjustable variance for the touch input (e.g., 10 Pa difference from the selected pressure amount).

In various embodiments, payment application 112 may allow the user to set actions/processes for a set of touch inputs, where each of the touch inputs is associated with an amount or degree of pressure the user applies to the touch input area of the computing device. The processes may be selected by a menu, entered through code, and/or recorded by payment application 112. Various selectable actions may include a payment amount, a tip amount, a payment contact, or other executable action. For example, an action may correspond to processes such as a payment to a user or a merchant, a setup process to configure the payment application, a review process for a transaction, a refund process to provide a refund to a customer, a transaction dispute process, a transfer process to send a fixed amount of funds, a tip process to provide a tip, and an application process to open the payment application or other application (or display the application on the touch screen). The action may also correspond to an emergency action to execute in the case of an emergency (e.g., a call or emergency message to an authority entity, such as the police). The emergency action may further include a geo-location of the user determined using communication device 110, such as through a GPS locator of communication device 110.

The actions may be used in payment application 112, or may be used with other applications of communication device 110. For example, the actions may be processes corresponding to a displayed interface of the payment application or while the payment application is execute (e.g., in a background of the operating system of the payment application). In other embodiments, the actions may be executed with another application (e.g., messaging, email, location/mapping, phone call, media playback, social networking, etc., applications) and/or the communication device 110's operating system. Once the action is established, payment application 112 may request that the user enter a touch input with an associated pressure amount. The touch input with the pressure amount may then be associated with the selected action/process so that entry of the touch input with the pressure amount to payment application 112 may cause execution of the action/process. As described above, payment application 112 may request the user to perform multiple entries of the touch input with the pressure amount in order to provide a variance in entry of the touch input during future use of the touch input. In various embodiments, the touch input may correspond to more than a tap, slide/swipe motion, or other simple finger motion that may be applied to touch interface component 120. For example, entry of a PIN or biometric (e.g., fingerprint) to unlock communication device 110 may be done with a plurality of pressures such that a different action is taken (e.g., unlock only with a soft touch input of a PIN, instantly open applications and display after unlock, etc.).

One or more of the aforementioned features and/or processes of contact processing application 130 may be included within payment application 112 or vice versa, for example, to provide their respective features within one application and/or application interface.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications may include social networking applications, media viewing, and/or merchant applications. Other applications 114 may include device interfaces and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices capable of displaying information to users and other output devices, including speakers.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with payment application 112 and/or other applications 114, identifiers associated with hardware of communication device 110, or other appropriate identifiers, such as identifiers used for payment/user/device authentication or identification, which may be communicated as identifying communication device 110 to payment provider server 150. Database 116 may include touch input information for a plurality of touch inputs having associated pressure/force readings applied during each of the plurality of touch inputs. Additionally, data for a touch input entered to touch interface component 120 may be stored to database 116.

Communication device 110 includes at least one communication module 118 adapted to communicate with merchant device 140 and/or payment provider server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Merchant device 140 may be implemented using any appropriate hardware and software configured for wired and/or wireless communication with communication device 110 and/or payment provider server 150. Although described below as a device, merchant device 140 may correspond to a device, server, or cloud computing architecture to provide sales of items, for example, through an online marketplace accessible over a network connection with merchant device 140 and/or a physical merchant location. Merchant device 140 may further be used to process payments for items and provide incentives for purchase of items and/or advertisement of items to other users. Although a merchant device is shown, the merchant device may be managed or controlled by any suitable processing device. Although only one merchant device is shown, a plurality of merchant devices may function similarly.

Merchant device 140 of FIG. 1 contains a sales application 142, other applications 144, a database 146, and a communication module 148. Sales application 142 and other applications 144 may correspond to processes, procedures, and/or applications executable by a hardware processor, for example, a software program. In other embodiments, merchant device 140 may include additional or different modules having specialized hardware and/or software as required.

Sales application 142 may correspond to one or more processes to execute modules and associated specialized hardware of merchant device 140 that provides an interface and/or online marketplace to sell one or more items offered by a merchant (not shown) associated with merchant device 140, and further provider checkout and payment processes for a transaction to purchase the items for sale from the merchant corresponding to merchant device 140. In this regard, sales application 142 may correspond to specialized hardware and/or software of merchant device 140 to provide a convenient interface to permit a merchant offer items for sale. For example, sales application 142 may be implemented as an application offering items for sale that may be utilized by the merchant or a merchant employee to enter items selected by a user to a transaction, determine a price for the transaction, and initiate a checkout and payment process for the transaction. In other embodiments, sales application 142 may be accessed by communication device 110 to select the items for sale to the user associated with communication device 110. In certain embodiments, sales application 142 may correspond to a website available over the Internet and/or online content and/or database information accessible through a dedicated application. Thus, sales module 160 may provide item sales through an online marketplace using the website of the merchant. However, in other embodiments, merchant device 140 may be local to a physical merchant location and provide transaction processing processes through interfaces displayed to a merchant or merchant employee at the merchant location.

Sales application 142 may include information for a price for the item, a discount for the item, a price change for the item, and/or other incentives for items and/or with the merchant corresponding to merchant device 140 (e.g., rebates, payments, etc.). Sales application 142 may be used to set and/or determine a benefit or incentive provided to a user of communication device 110. The sales data and other item data may be retrievable by communication device 110 and/or payment provider server 150, such as requestable through an API call, retrievable from a database, and/or scraped from an online resource. The information may be based updated periodically or continuously, such as in real time and information for the item(s) for sale changes.

Sales application 142 may be used to establish a transaction once the user associated with communication device 110 has selected one or more items for purchase. Once a payment amount is determined for the transaction for the item(s) to be purchased, sales application 142 may request payment from the user. Sales application 142 may receive payment processing information, such as a payment and a receipt. In such embodiments, the payment request may be processed, payment provided to the merchant account, and notification of payment (or failure, for example, where there are insufficient user funds) may be sent to sales application 142. The payment may be made by payment provider server 150 on behalf of the user associated with communication device 110. Sales application 142 may then receive the results of the transaction processing, and complete the transaction with the user, for example, by providing the user the items for the transaction or declining the transaction where the user is not authenticated or the transaction is not authorized (e.g., insufficient funds).

Merchant device 140 includes other applications 144 as may be desired in particular embodiments to provide features to merchant device 140. For example, other applications 144 may include security applications for implementing server-side security features, programmatic client applications for interfacing with appropriate application programming interfaces (APIs) over network 150, or other types of applications. Other applications 144 may also include email, texting, voice and IM applications that allow a user to send and receive emails, calls, texts, and other notifications through network 150. In various embodiments, other applications 144 may include financial applications, such as banking, online payments, money transfer, or other applications associated with payment provider server 150. Other applications 144 may contain software programs, executable by a processor, including a graphical user interface (GUI) configured to provide an interface to the user.

Merchant device 140 may further include database 146 which may include, for example, identifiers such as operating system registry entries, cookies associated with sales application 142 and/or other applications 144, identifiers associated with hardware of merchant device 140, or other appropriate identifiers, such as identifiers used for payment/user/device authentication or identification. Identifiers in database 146 may be used by a payment/credit provider, such as payment provider server 150, to associate merchant device 140 with a particular account maintained by the payment/credit provider. Item, sales, and/or benefit information for items sold by the merchant associated with merchant device 140 may be stored to database 146. Database 146 may further include transaction information and/or results, including transaction histories.

Merchant device 140 includes at least one communication module 148 adapted to communicate with communication device 110 and/or payment provider server 150. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Payment provider server 150 may be maintained, for example, by an online service provider, which may provide connection services on behalf of users. In this regard, payment provider server 150 includes one or more processing applications which may be configured to interact with communication device 110, merchant device 150, and/or another device/server to facilitate connecting users having a shared interest. In one example, payment provider server 150 may be provided by PAYPAL®, Inc. of San Jose, Calif., USA. However, in other embodiments, payment provider server 150 may be maintained by or include another type of service provider, which may provide connection services to a plurality of users.

Payment provider server 150 of FIG. 1 includes a transaction processing application 152, other applications 154, a database 156, and a network interface component 158. Transaction processing application 152 and other applications 154 may correspond to executable processes, procedures, and/or applications with associated hardware. In other embodiments, payment provider server 150 may include additional or different modules having specialized hardware and/or software as required.

Transaction processing application 152 may correspond to one or more processes to execute software modules and associated specialized hardware of payment provider server 150 to provide payment services to merchants and users, for example though a payment account and/or payment instruments. In this regard, transaction processing application 152 may correspond to specialized hardware and/or software to provide payment services and payment accounts, including digital wallets storing payment instruments. The payment services may allow for a payment to the merchant by a user through a payment instrument, including a credit/debit card, banking account, payment account with payment provider server 150, and/or other financial instrument. In order to establish a payment account for a merchant and/or user to send and receive payments, transaction processing application 152 may receive information requesting establishment of the payment account. The information may include user personal and/or financial information. Additionally the information may include a login, account name, password, PIN, or other account creation information. The merchant/user may provide a name, address, social security number, or other personal information necessary to establish the account and/or effectuate payments through the account. Transaction processing application 152 may further allow the merchant/user to service and maintain the payment account, for example, by adding and removing payment instruments. Transaction processing application 152 may be used to provide a payment for an item to a merchant, for example, between communication device 110 and merchant device 140 (e.g., using touch inputs with communication device 110 to effectuate the payment). Transaction processing application 152 may debit an account of the user automatically and provide the payment to an account of the merchant. Transaction processing application 152 may also be used to provide transaction histories for processed transactions.

In various embodiments, payment provider server 150 includes other applications 154 as may be desired in particular embodiments to provide features to payment provider server 134. For example, other applications 154 may include security applications for implementing server-side security features, programmatic client applications for interfacing with appropriate application programming interfaces (APIs) over network 160, or other types of applications. Other applications 154 may contain software programs, executable by a processor, including a graphical user interface (GUI), configured to provide an interface to the user when accessing payment provider server 160, where the user or other users may interact with the GUI to more easily view and communicate information. In various embodiments, other applications 154 may include connection and/or communication applications, which may be utilized to communicate information to over network 160.

Additionally, payment provider server 150 includes database 156. As previously discussed, the user and/or the merchant corresponding to telecommunication carrier server 170 may establish one or more digital wallets and/or payment accounts with payment provider server 150. Digital wallets and/or payment accounts in database 156 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to payment provider server 150, e.g., from communication device 110, one or more digital wallets and/or payment accounts belonging to the users may be found. Database 156 may also store the user preferences for an account for the user and/or merchant.

In various embodiments, payment provider server 150 includes at least one network interface component 158 adapted to communicate communication device 110 and/or merchant device 140 over network 160. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2A:
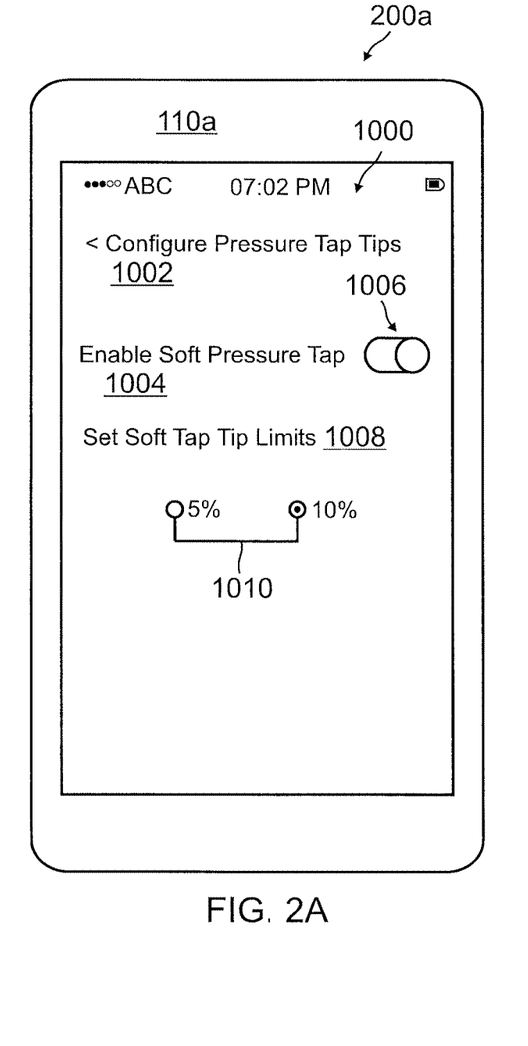
FIG. 2A is an exemplary setup screen for a payment application to establish touch inputs with payment processes, according to an embodiment.

FIG. 2A is an exemplary setup screen for a payment application to establish touch inputs with payment processes, according to an embodiment. Environment 200a includes a communication device 110 corresponding generally to the described features, processes, and components of communication device 110 in environment 100 of FIG. 1. In this regard, a user utilizing communication device 110 may view an interface 1000 on communication device 110, where interface 1000 corresponds to an interface of a payment application, such as payment application 112 of communication device 110 in environment 100 of FIG. 1.

Interface 1000 in environment 200 displays an exemplary setup process for establishing a pressure sensitivity setting for a touch input that defines an action or process to execute when the touch input with that pressure is applied to communication device 110 (e.g., during a checkout process for a transaction). For example, interface 1000 includes a configuration process having an option to configure pressure tap tips 1002. Configure pressure tap tips 1002 includes a selectable option to enable soft pressure tap by selection option 1006. A user of communication device 110 may configure pressure tap tips by moving option 1006 to a "yes," "on," or other indication that the user would like to begin the process for enable soft pressure tap 1004. Moreover, interface 1000 includes an option to set soft tap tip limits 1008, which allows the user to select the process or action to execute with the "tap" or touch input. In this regard, interface 1000 allows the user to provide a tip or gratuity amount to a transaction using a "soft tap." Interface 1000 further allows the user to specify the tip amount, either 5% or 10% in option 1010, which is shown to be selected as a 10% tip. After selection of 10%, interface 1000 may move to an interface 1100 shown in FIG. 2B.

Figure 2B:
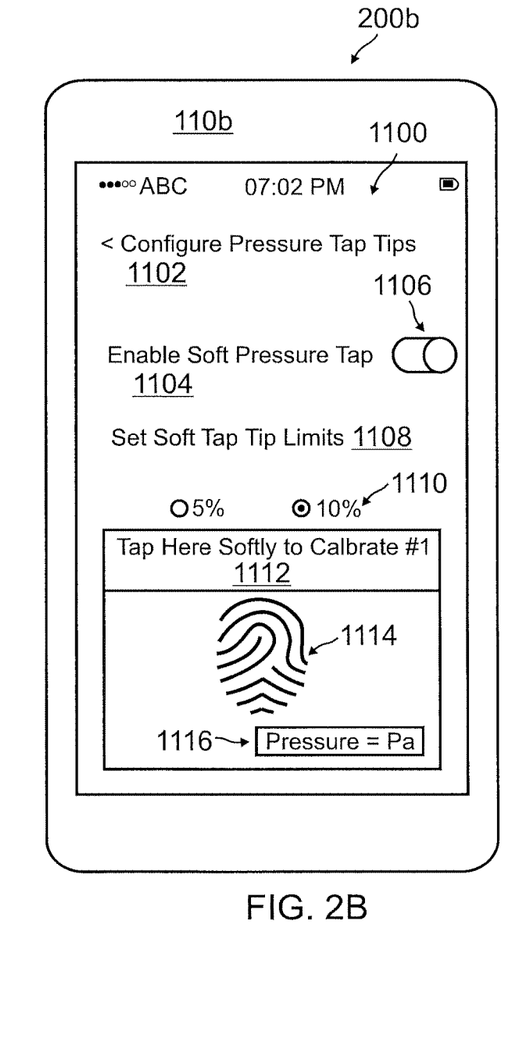
FIG. 2B is an exemplary setup screen for setting touch input pressure for use with payment processes of a payment application, according to an embodiment.

FIG. 2B is an exemplary setup screen for setting touch input pressure for use with payment processes of a payment application, according to an embodiment. Environment 200b includes a communication device 110 corresponding generally to the described features, processes, and components of communication device 110 in environment 100 of FIG. 1. In this regard, a user utilizing communication device 110 may view an interface 1100 on communication device 110, where interface 1100 corresponds to an interface of a payment application, such as payment application 112 of communication device 110 in environment 100 of FIG. 1.

After selection of an action for a touch input and corresponding pressure setting name (e.g., "soft tap," where the pressure setting name may be changed otherwise, such as first, second, medium, hard, etc.), interface 1100 may display on communication device 110. Interface 1100 includes a configure pressure tap tips 1102 similar to configure pressure tap tips 1002 on interface 1000 of FIG. 2A. For example, enable soft pressure tap 1104 is still selected for setting under option 1106, and set soft tip tap limits 1108 is selected as 10% under option 1110. However, interface 1100 further display a tap calibration field 1112, where the user is instructed to "tap here softly to calibrate." Using the tap calibration field 1112, a user may enter a tap 1114 (e.g., a fingerprint tap or other touch input) as a touch input with a pressure amount. Interface 1100 may further display a pressure 1116 for tap 1114, such as 10 Pa, which may be the defined pressure amount for tap 1114 to provide a 10% as selected in option 1110. In further embodiments, the user may be required to enter additional taps to tap calibration field 1112 for calibration and establishment of the touch input for the 10% tip. For example, the user may be requested to enter a second "tap" to tap calibration field 1112. When the user enters the second tap, the user may apply 12 Pa of pressure to interface 1100 in tap calibration field 1112. Device 110 may determine that the user has applied a range of 10-12 Pa of pressure for the two taps, and may therefore associated a "soft tap" in soft tap tip limits 1108 as a range of 10-12 Pa. In other embodiments, the soft tap may be from 0-12 Pa where there are no lighter taps and thus less pressure applied during a tap for a different action (e.g., different tip amount). The user may further be requested to enter a third tap, where the third tap has 15 Pa. The upper limit on the soft tap for soft tap tip 1108 may then be set as 15 Pa, having a range of 0-15 Pa or 10-15 Pa as previously discussed. Thus, on receipt of a tap at 0-15 Pa (or 10-15 Pa), the device may provide a 10% tip.

Additionally, the user may set a limit for a "hard tap," which may provide the 5% tip as shown unselected in soft tip tap limits 1108. In this regard, interfaces similar to interface 1000 and interface 1100 may request that a user configure a hard tap, which may be set similar to as described above. A tap calibration field may receive a tap input for a hard tap, which may correspond to 25 Pa. The interfaces may request that the user enter multiple tap inputs, which may include pressures between 20-35 Pa. The device may then associate the hard tap with 20-35 Pa taps, and may provide the 5% tip when received.

Figure 3:
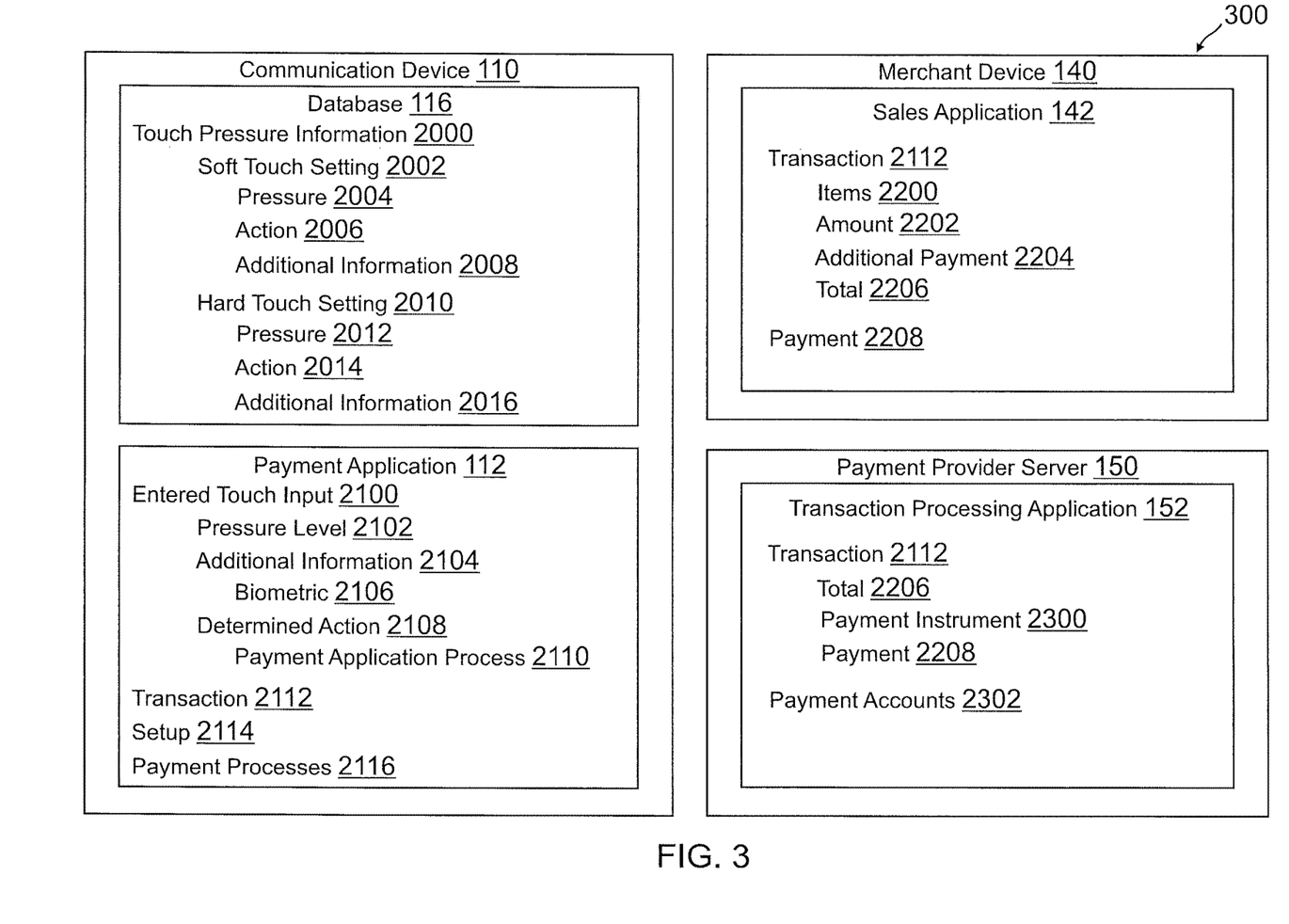
FIG. 3 is an exemplary system environment showing a communication device of a user receiving touch inputs and executing payment processes with a merchant device and a payment provider server based on the touch inputs, according to an embodiment.

FIG. 3 is an exemplary system environment showing a communication device of a user receiving touch inputs and executing payment processes with a merchant device and a payment provider server based on the touch inputs, according to an embodiment. FIG. 3 includes communication device 110, communication device 130, and a payment provider server 150 all discussed in reference to environment 100 of FIG. 1.

Communication device 110 executes payment application 112 and includes a database 116 corresponding generally to the specialized hardware and/or software modules and processes described in reference to FIG. 1. In this regard, database 116 includes touch input information and data for a plurality of touch inputs that cause execution of an action or process when received by communication device 110. For example, touch input information 2000 may include a plurality of touch inputs each having an associated pressure amount applied for the touch input, which cause communication device 110 to execute a process when received. For example, touch input information 2000 includes soft touch setting 2002 and hard touch setting 2010. Soft touch setting 2002 includes a pressure 2004, an action 2006 for execution by communication device 110, and additional information 2008, which may correspond to information about applications that soft touch setting 2002 is specific to, biometric information (e.g., a specific fingerprint), motion information, or other data for soft touch setting 2002. Similarly, hard touch setting 2010 includes a pressure 2012, an action 2014, and additional information 2016.

Payment application 112 may be receive touch inputs, which may be processed using the information available from database 116. For example, payment application 112 includes an entered touch input 2100. Entered touch input 2100 may include data determined for entered touch input, such as a pressure level 2102 and additional information 2104, such as a biometric 2106 detected for entered touch input 2100. Payment application 112 may utilize touch input information 2000 stored to database 116 to associated entered touch input 2100 with a touch input and corresponding action/process. Thus, determined action 2108 may be determined for entered touch input 2100, which may correspond to a payment application process 2110. For example, payment application process 2110 may include a process for a transaction 2112 in payment application 112, setup 2114 of payment application 112, and/or other payment processes 2116 (e.g., money transfers, account/payment review, transaction disputes, etc.).

Merchant device 140 executes sales application 142 corresponding generally to the specialized hardware and/or software modules and processes described in reference to FIG. 1. In this regard, sales application 142 may be used to establish and/or process a transaction between communication device 110 and merchant device 140. Thus, sales application 142 includes a transaction 2112, which may be populated in payment application 112 for processing. The processing of transaction 2112 may occur using one or more touch inputs, such as entered touch input 2100. Transaction 2112 may include items 2200, an amount 2202, an additional payment 2204 (e.g., a tip), and a total 2206 for transaction 2112. Additionally, sales application 142 may include information for a payment 2208 by a user associated with communication device 110 for transaction 2112.

Payment provider server 150 executes transaction processing application 152 corresponding generally to the specialized hardware and/or software modules and processes described in reference to FIG. 1. In this regard, transaction processing application 152 may be used to process a transaction between communication device 110 and merchant device 140. For example, transaction processing application 152 includes information for transaction 2112 in order to provide transaction processing and payments. Thus, transaction processing application 152 may utilize total 2206 for transaction 2112 with payment instrument 2300 selected by a user associated with communication device 110 to provide payment 2208 to merchant device 140. In various embodiments, transaction processing application 152 may further include information for one or more payment accounts 2302, for example, payment accounts associated with a user and/or merchant.

Figure 4:
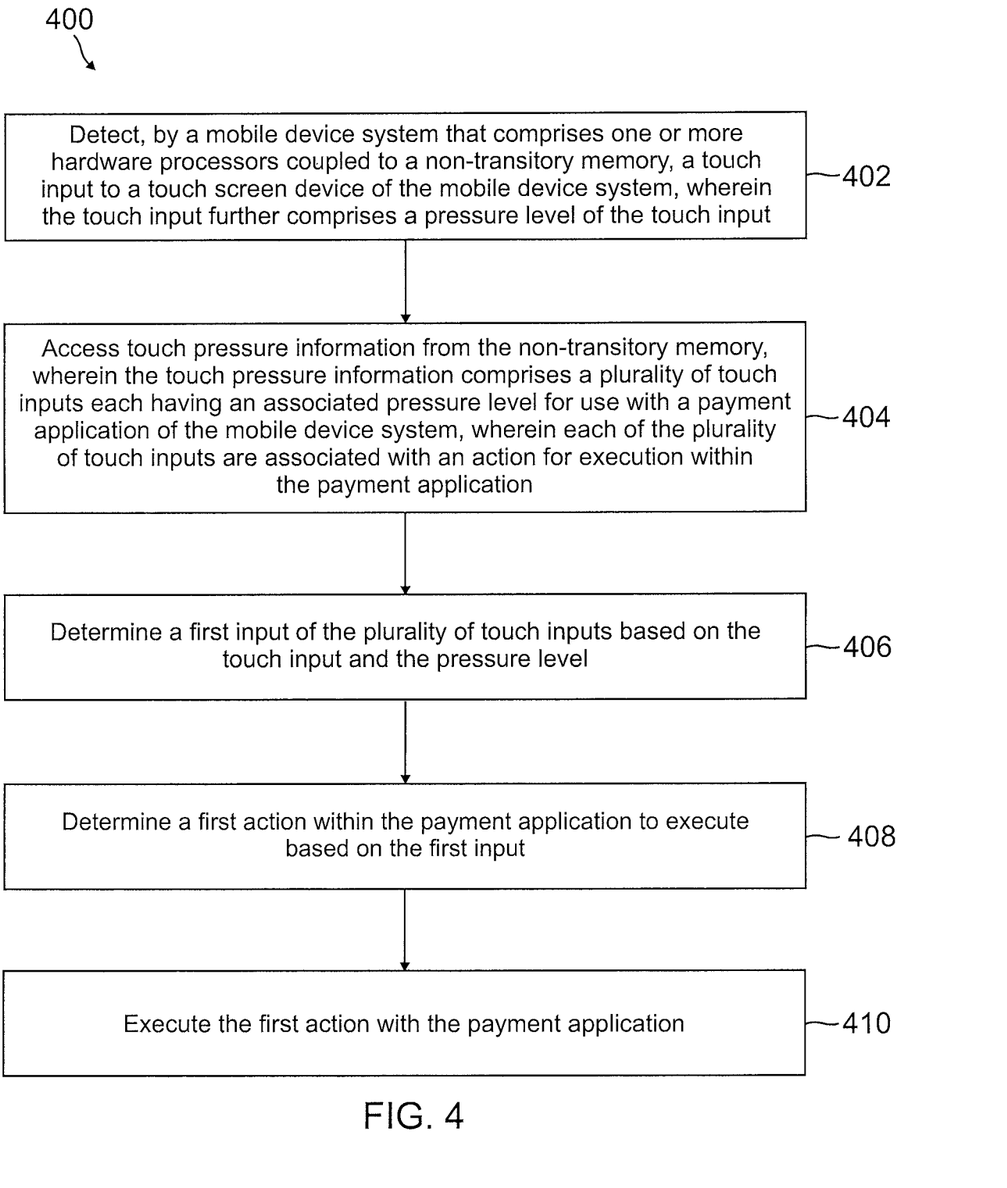
FIG. 4 is a flowchart of an exemplary process for measuring tap pressure on mobile devices to automate payments, according to an embodiment.

FIG. 4 is a flowchart of an exemplary process for measuring tap pressure on mobile devices to automate payments, according to an embodiment. Note that one or more steps, processes, and methods described herein may be omitted, performed in a different sequence, or combined as desired or appropriate.

At step 402, a touch input to a touch screen device of a mobile device system is detected, by the mobile device system that comprises one or more hardware processors coupled to a non-transitory memory, wherein the touch input further comprises a pressure level of the touch input. Touch pressure information is accessed from the non-transitory memory, wherein the touch pressure information comprises a plurality of touch inputs each having an associated pressure level for use with a payment application of the mobile device system, wherein each of the plurality of touch inputs are associated with an action for execution within the payment application, at step 404. The touch input may further comprise a fingerprint of a user of the mobile device system, wherein the touch pressure information is accessed using the fingerprint. In various embodiments, the touch input comprises an entry of a password or a Personal Identification Number (PIN), wherein the first action configures the payment application to execute selected payment processes set with the first action.

At step 406, a first input of the plurality of touch inputs is determined based on the touch input and the pressure level. In order to establish the first input, the mobile device system may receive a first request to establish a first input of the plurality of touch inputs, wherein the first input comprises the first input. The mobile device system may further receive a first pressure entry for the first input, wherein the first pressure entry comprises the first pressure of the first input. Additionally, a first selection of the first action for associating with the first input may be received by the mobile device system, and the first action may be paired with the first input. The user may establish further touch inputs. For example, a second request to establish a second input of the plurality of touch inputs, a second pressure entry for the second input, and a second selection of a second action for associating with the second input may be received by the mobile device system (e.g., from the user). The mobile device system may then pair the second action with the second input.

The first pressure selection may be generated using a plurality of touch inputs entered by a user to the touch screen device to establish the first pressure selection. The first input may comprise one of a soft touch input and a hard touch input. For example, the soft touch input may be between 0 to 15 pascal (Pa), and the hard touch input may be between 20 to 35 Pa. A first action with the payment application to execute based on the first input is determined, at step 408. The first action is then executed with the payment application, at step 410. The first action may comprise a first payment amount sent using the payment application, wherein the payment application provides the first payment amount to one of a user and a merchant based on the first action. The first payment amount may comprise a preset tip amount to be added to a transaction processed using the payment application. The plurality of touch inputs may further comprise a second input having a second pressure level, wherein the second input is associated with a second action, and wherein the second action comprises a second payment amount.

The payment application may be associated with an online payment provider, wherein the first action comprises a payment using the online payment provider. The payment using the online payment provider may use a payment account for a user associated with the mobile device system. In various embodiments, the first input may comprise an emergency process to alert an authority figure of an emergency, wherein first action comprises an emergency contact to the authority figure with a geo-location of the mobile device system. In further embodiments, the first action may comprise one of a payment process to provide a payment to a user or a merchant, a setup process to configure the payment application, a review process for a transaction, a refund process to provide a refund to a customer, a transaction dispute process, a transfer process to send a fixed amount of funds, a tip process to provide a tip, and an application process to open the payment application. The payment application may execute in a background of the mobile device system, wherein the first action executes a process of the payment application without displaying an interface of the payment application on the mobile device system. The plurality of touch inputs may be particular to an application interface displayed on output display device of the mobile device system, wherein the first action executes a process associated with the application interface displayed on the output display.

Various types of different actions may also be executed based on a touch input having a pressure amount. For example, although the payment application may provide payments, change transaction amounts (e.g., by adding a tip amount), and/or providing authentication, the user may also configure the application to open interfaces depending on a received touch pressure. For example, if a PIN is entered using a specific touch pressure, the application may automatically open an interface or portal, such as a person to person payment interface, a merchant payment interface, a transfer interface, a dispute interface, and/or another type of application interface. Thus, the launch screen of the application may be determined based on a touch input, including a tap of an application icon displayed on the device home screen. In other embodiments, different touch inputs and pressures may be used to open different applications and/or interfaces and portals of the application.

Other types of actions executed using a touch input may include tapping a current transaction, a processing transaction, and/or a processed transaction to retrieve a dispute resolution page. A hard tap may open a dispute, while a soft tap may confirm a transaction, cancel a dispute, or otherwise interact with a dispute resolution process. The tap may also include emergency taps, where if the user is being extorted for money, a tap with a certain pressure during a transfer or transaction may contact a nearby emergency authority (e.g., the police) and alert the authority of the danger. The tap may further include a geo-location of the user for use in assisting the police with reaching the user. The taps may be configured for each page, interface, and/or screen of an application and/or operating system. For example, a hard touch for a configuration screen, home screen, and/or payment screen may each execute different processes.

Figure 5:
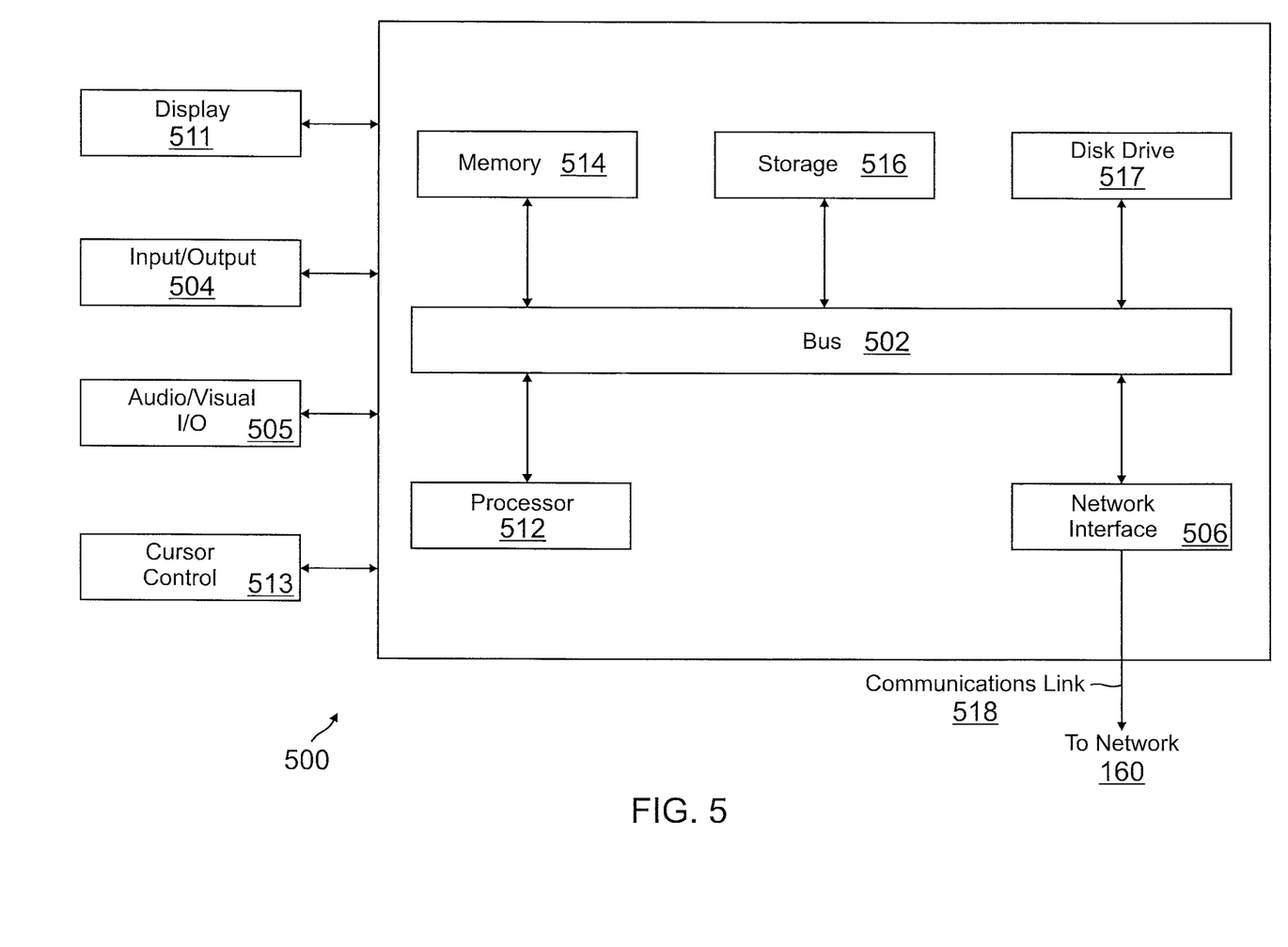
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A mobile device system comprising:
   a non-transitory memory storing touch pressure information comprising a plurality of preconfigured touch inputs each having an associated pressure level for use with an application of the mobile device system, wherein each of the plurality of preconfigured touch inputs are associated with an action for execution within the application; and
   one or more hardware processors coupled to the non-transitory memory and configured to read instructions to cause the mobile device system to perform operations comprising:
      detecting a plurality of touch inputs on a touch screen device of the mobile device system during an unlocking process with the mobile device system, wherein the plurality of touch inputs correspond to a plurality of pressure levels;
      accessing the touch pressure information from the non-transitory memory;
      determining that the plurality of touch inputs correspond to a request to access an application based on the plurality of pressure levels and the touch pressure information;
      determining, based on the plurality of pressure levels, that the plurality of touch inputs further correspond to an electronic transaction processing operation of the application for a transaction with an entity;
      in response to determining that the plurality of touch inputs correspond to the request to access the application and the electronic transaction processing operation, automatically launching the application;
      in response to the launching, displaying an interface associated with the electronic transaction processing operation through the touch screen device, wherein the interface comprises a data field for entry of an input to the transaction;
      detecting a first touch input to the touch screen interface associated with the data field of the interface, wherein the first touch input comprises a first pressure level of the first touch input;
      determining a first action within the application to execute based on the first touch input and the touch pressure information, wherein the first action further comprises data for the input to the data field;
      entering the data to the data field; and
      executing the first action within the application.

2. The mobile device system of claim 1, wherein the first action comprises a first payment sent to the entity using the application, and wherein the first payment is based on the data entered to the data field.

3. The mobile device system of claim 2, wherein first payment comprises a preset tip to be added to a transaction processed using the application.

4. The mobile device system of claim 2, wherein the plurality of preconfigured touch inputs further comprise a second touch input having a second pressure level, wherein the second touch input is associated with a second action, and wherein the second action comprises a second payment.

5. The mobile device system of claim 1, wherein the operations further comprise:
   receiving a first request to establish the first touch input; and
   receiving a first pressure entry for the first touch input, wherein the first pressure entry comprises the first pressure level of the first touch input.

6. The mobile device system of claim 5, wherein the operations further comprise:
   receiving a first selection of the first action for associating with the first touch input; and
   associating the first action with the first touch input.

7. The mobile device system of claim 6, wherein the operations further comprise:
   receiving a second request to establish a second touch input;
   receiving a second pressure entry for the second touch input;
   receiving a second selection of a second action for associating with the second touch input; and
   associating the second action with the second touch input.

8. The mobile device system of claim 6, wherein the first touch input comprises one of a touch input of a first pressure type or a touch input of a second pressure type.

9. The mobile device system of claim 8, wherein the first pressure type is between 0 to 15 pascal (Pa), and wherein the second pressure type is between 20 to 35 Pa.

10. The mobile device system of claim 5, wherein the first pressure entry is generated using a plurality of touch pressures entered to the touch screen device.

11. The mobile device system of claim 1, wherein the plurality of touch inputs further comprise a fingerprint of a user of the mobile device system, and wherein the touch pressure information is accessed using the fingerprint.

12. The mobile device system of claim 11, wherein the plurality of touch inputs comprise an entry of a password or a Personal Identification Number (PIN).

13. The mobile device system of claim 1, wherein the application is associated with an online payment provider providing the electronic transaction processing operation, and wherein the first action comprises a payment for the transaction processed through the electronic transaction processing operation using the online payment provider.

14. The mobile device system of claim 13, wherein the payment using the online payment provider is processed using a payment account for a user associated with the mobile device system.

15. A method comprising:
   detecting, by a mobile device system that comprises one or more hardware processors coupled to a non-transitory memory, a plurality of touch inputs on a touch screen device of the mobile device system during an unlocking process with the mobile device system, wherein the plurality of touch inputs further comprises a plurality of pressure levels of the plurality of touch inputs;
   accessing touch pressure information from the non-transitory memory, wherein the touch pressure information comprises a plurality of preconfigured touch inputs each having an associated pressure level for use with an application of the mobile device system, wherein each of the plurality of touch inputs is associated with an action for execution within the application;
   determining that the plurality of touch inputs correspond to a request to access an application based on the plurality of pressure levels and the touch pressure information;
   determining, based on the plurality of pressure levels, that the plurality of touch inputs further correspond to an electronic transaction processing operation of the application for a transaction with an entity;
   in response to determining that the plurality of touch inputs correspond to the request to access the application and the electronic transaction processing operation, automatically launching the application;
   in response to the launching, displaying an interface associated with the electronic transaction processing operation through the touch screen device, wherein the interface comprises a data field for entry of an input to the transaction;
   detecting a touch input to the touch screen interface associated with the data field of the interface, wherein the touch input comprises a pressure level of the touch input;
   determining a first action with the application to execute based on the touch input and the touch pressure information, wherein the first action further comprises data for the input to the data field;
   entering the data to the data field; and
   executing the first action with the application.

16. The method of claim 15, wherein the first action comprises one of a payment process to provide a payment to a user or a merchant, a review process for a transaction, a refund process to provide a refund to a customer, a transaction dispute process, a transfer process to send a fixed amount of funds, or a tip process to provide a tip.

17. The method of claim 15, wherein the first action enables execution of a process of the application without requiring text input to the data field.

18. The method of claim 15, wherein the plurality of preconfigured touch inputs are particular to unlocking the application without unlocking another application on the mobile device system.

19. The method of claim 15 further comprising:
   alert an authority figure of an emergency associated with the electronic transaction processing operation with a geo-location of the mobile device system and the data.

20. A non-transitory machine-readable medium having stored thereon machine-readable instructions executable to cause a machine to perform operations comprising:
   detecting, by a mobile device system that comprises one or more hardware processors coupled to a non-transitory memory, a touch input to a touch screen device of the mobile device system, wherein the touch input further comprises a pressure level of the touch input;
   accessing touch pressure information from the non-transitory memory, wherein the touch pressure information comprises a plurality of touch inputs each having an associated pressure level for use with an application of the mobile device system, wherein each of the plurality of touch inputs is associated with an action for execution within the application;
   determining that the touch input requests an opening of the application when unlocking the mobile device system based on the pressure level and the touch pressure information;
   determining, based on the plurality of pressure levels, that the plurality of touch inputs further correspond to an electronic transaction processing operation of the application for a transaction with an entity;
   in response to determining that the plurality of touch inputs correspond to the request to access the application and the electronic transaction processing operation, automatically launching the application;
   in response to the launching, displaying an interface associated with the electronic transaction processing operation through the touch screen device, wherein the interface comprises a data field for entry of an input to the transaction;
   detecting a touch input to the touch screen interface associated with the data field of the interface, wherein the touch input comprises a pressure level of the touch input;
   determining a first action with the application to execute based on the first touch input and the touch pressure information, wherein the first action further comprises data for the input to the data field;
   entering the data to the data field; and
   executing the first action with the application.

* * * * *